(12) United States Patent
Chang et al.

(10) Patent No.: US 11,273,686 B2
(45) Date of Patent: Mar. 15, 2022

(54) ELECTRIFIED VEHICLE WITH CONTROL STRATEGY FOR MANAGING BATTERY AND CABIN COOLING

(71) Applicant: Ford Global Technologies, LLC, Dearborn, MI (US)

(72) Inventors: Jennifer Helen Chang, Livonia, MI (US); Christopher Michael Kava, Livonia, MI (US); Craig Lechlitner, Belleville, MI (US); Brett Allen Dunn, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 114 days.

(21) Appl. No.: 16/823,486

(22) Filed: Mar. 19, 2020

(65) Prior Publication Data

US 2021/0291629 A1 Sep. 23, 2021

(51) Int. Cl.
*B60H 1/00* (2006.01)
*B60H 1/32* (2006.01)
*B60L 58/24* (2019.01)

(52) U.S. Cl.
CPC ....... *B60H 1/3208* (2013.01); *B60H 1/00278* (2013.01); *B60L 58/24* (2019.02); *B60H 2001/3272* (2013.01); *B60Y 2200/91* (2013.01); *B60Y 2200/92* (2013.01)

(58) Field of Classification Search
CPC .............. B60H 1/3208; B60H 1/00278; B60H 2001/3272; B60L 58/24; B60Y 2209/91; B60Y 2200/92
USPC ......................................................... 165/271
See application file for complete search history.

(56) References Cited

U.S. PATENT DOCUMENTS

| 9,212,599 B2 | 12/2015 | Gao et al. | |
| 10,040,336 B2 * | 8/2018 | Morishita | .......... B60H 1/00899 |
| 10,384,511 B2 | 8/2019 | Porras et al. | |
| 2010/0025125 A1 | 2/2010 | Bienert et al. | |
| 2015/0013367 A1 * | 1/2015 | Carpenter | .......... B60H 1/00278 |
| | | | 62/222 |
| 2017/0088006 A1 | 3/2017 | Blatchley et al. | |

* cited by examiner

*Primary Examiner* — Davis D Hwu
(74) *Attorney, Agent, or Firm* — David B. Kelley; Carlson, Gaskey & Olds, P.C.

(57) ABSTRACT

This disclosure relates to an electrified vehicle having a control strategy for managing battery and cabin cooling. A corresponding method is also disclosed. An example electrified vehicle includes a cabin thermal management system configured to thermally condition a cabin of the electrified vehicle. The cabin thermal management system includes a compressor. The vehicle further includes a battery thermal management system configured to thermally condition a battery of the electrified vehicle, and a controller configured issue an instruction to reduce the speed of the compressor based, at least in part, on a speed of the electrified vehicle and a temperature of the battery.

19 Claims, 3 Drawing Sheets

ELECTRIFIED VEHICLE WITH CONTROL STRATEGY FOR MANAGING BATTERY AND CABIN COOLING

TECHNICAL FIELD

This disclosure relates to an electrified vehicle having a control strategy for managing battery and cabin cooling. A corresponding method is also disclosed.

BACKGROUND

The need to reduce fuel consumption and emissions in vehicles is well known. Therefore, vehicles are being developed that reduce or completely eliminate reliance on internal combustion engines. Electrified vehicles are one type of vehicle being developed for this purpose. In general, electrified vehicles differ from conventional motor vehicles because they are selectively driven by one or more battery powered electric machines. Conventional motor vehicles, by contrast, rely exclusively on the internal combustion engine to propel the vehicle.

A high voltage battery pack typically powers the electric machines of an electrified vehicle. The battery pack may include one or more groupings of interconnected battery cells. The battery cells generate heat during certain conditions, such as charging and discharging operations. Battery thermal management systems are employed to manage the heat generated by the battery cells of the battery pack.

SUMMARY

An electrified vehicle according to an exemplary aspect of the present disclosure includes, among other things, a cabin thermal management system configured to thermally condition a cabin of the electrified vehicle. The cabin thermal management system includes a compressor. The vehicle further includes a battery thermal management system configured to thermally condition a battery of the electrified vehicle, and a controller configured issue an instruction to reduce the speed of the compressor based on a speed of the electrified vehicle and a temperature of the battery.

In a further non-limiting embodiment of the foregoing electrified vehicle, the cabin thermal management system includes a cabin blower configured to communicate an airflow into a passenger cabin, and, when the controller issues the instruction to reduce the speed of the compressor, the controller is also configured to issue an instruction to reduce a speed of the cabin blower.

In a further non-limiting embodiment of any of the foregoing electrified vehicles, the controller is only configured to issue the instruction to reduce the speed of the compressor when the temperature of the battery meets or exceeds a lower battery threshold.

In a further non-limiting embodiment of any of the foregoing electrified vehicles, when the temperature of the battery meets or exceeds an upper battery threshold, the controller is configured to issue an instruction to stop the compressor.

In a further non-limiting embodiment of any of the foregoing electrified vehicles, when the temperature of the battery is between the lower battery threshold and the upper battery threshold, the controller is configured to form an initial instruction to partially reduce the speed of the compressor.

In a further non-limiting embodiment of any of the foregoing electrified vehicles, the controller is configured to selectively adjust the initial instruction based on a probability of a cabin cooling request.

In a further non-limiting embodiment of any of the foregoing electrified vehicles, the controller is configured to determine the probability of a cabin cooling request based on a cabin temperature and an ambient temperature.

In a further non-limiting embodiment of any of the foregoing electrified vehicles, the controller is configured to not adjust the initial instruction such that the controller issues an instruction to fully stop the compressor if the cabin temperature meets or is below a lower cabin threshold.

In a further non-limiting embodiment of any of the foregoing electrified vehicles, the controller is configured to instruct the compressor to run at a higher speed than the initial instruction when the cabin temperature is between a lower cabin threshold and an upper cabin threshold.

In a further non-limiting embodiment of any of the foregoing electrified vehicles, the electrified vehicle is one of a hybrid electric vehicle, plug-in hybrid electric vehicle, and a battery electric vehicle.

In a further non-limiting embodiment of any of the foregoing electrified vehicles, the cabin thermal management system includes a condenser, and the battery thermal management system includes a radiator adjacent the condenser.

In a further non-limiting embodiment of any of the foregoing electrified vehicles, battery thermal management system does not include a chiller configured to cool the coolant that thermally conditions the battery.

A method according to an exemplary aspect of the present disclosure includes, among other things, reducing a speed of a compressor of a cabin thermal management system of an electrified vehicle based on a speed of the electrified vehicle and a temperature of a battery of the electrified vehicle.

In a further non-limiting embodiment of the foregoing method, the method includes reducing a maximum speed for a cabin blower of the cabin thermal management system when reducing the speed of the compressor.

In a further non-limiting embodiment of any of the foregoing methods, the reducing step is only performed when a temperature of the battery meets or exceeds a lower battery threshold.

In a further non-limiting embodiment of any of the foregoing methods, the reducing step includes fully stopping the compressor when the temperature of the battery meets or exceeds an upper battery threshold.

In a further non-limiting embodiment of any of the foregoing methods, the method includes forming an initial instruction to reduce the speed of the compressor when the temperature of the battery is between a lower battery threshold and an upper battery threshold.

In a further non-limiting embodiment of any of the foregoing methods, the method includes selectively adjusting the initial instruction to form a final instruction based on a cabin temperature and an ambient temperature.

In a further non-limiting embodiment of any of the foregoing methods, the method includes increasing the speed of the compressor when there is a likelihood of a cabin cooling request.

In a further non-limiting embodiment of any of the foregoing methods, when the cabin temperature meets or is below a lower cabin temperature threshold, the final instruction is to fully stop the compressor.

DETAILED DESCRIPTION

This disclosure relates to an electrified vehicle having a control strategy for managing battery and cabin cooling. A corresponding method is also disclosed. An example electrified vehicle includes a cabin thermal management system configured to thermally condition a cabin of the electrified vehicle. The cabin thermal management system includes a compressor. The vehicle further includes a battery thermal management system configured to thermally condition a battery of the electrified vehicle, and a controller configured issue an instruction to reduce the speed of the compressor based, at least in part, on a speed of the electrified vehicle and a temperature of the battery. This disclosure has a number of other benefits which will be appreciated from the following description. Among them, this disclosure achieves effective battery cooling under certain conditions without requiring a chiller, which reduces cost relative to some known vehicles.

Figure 1:
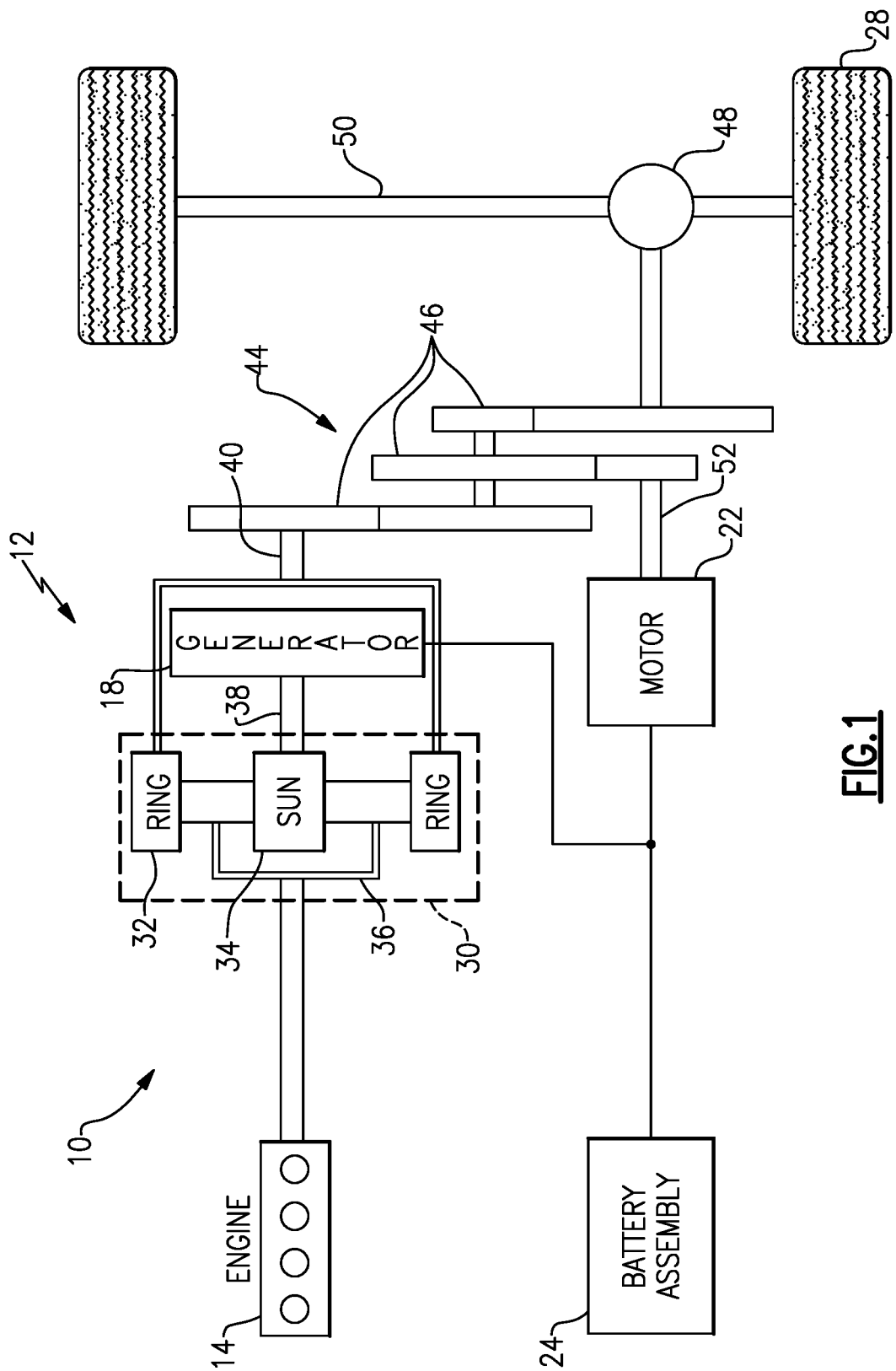
FIG. 1 schematically illustrates an example powertrain of an electrified vehicle.

FIG. 1 schematically illustrates an example powertrain 10 for an electrified vehicle 12 ("vehicle 12"), which in this example is a hybrid electric vehicle (HEV). The powertrain 10 may be referred to as a hybrid transmission. Although depicted as an HEV, it should be understood that the concepts described herein are not limited to HEVs and could extend to other electrified vehicles, including, but not limited to, plug-in hybrid electric vehicles (PHEVs), and battery electric vehicles (BEVs). This disclosure also extends to various types of hybrid vehicles including full hybrids, parallel hybrids, series hybrids, mild hybrids, micro hybrids, and plug-in hybrids. Further, the vehicle 12 is depicted schematically in FIG. 1, but it should be understood that this disclosure is not limited to any particular type of vehicle, and extends to cars, trucks, sport utility vehicles (SUVs), vans, etc.

In the embodiment of FIG. 1, the powertrain 10 is a power-split transmission that employs a first drive system and a second drive system. The first drive system includes a combination of an engine 14 and a generator 18 (i.e., a first electric machine). The second drive system includes at least a motor 22 (i.e., a second electric machine) and a battery assembly 24 (which may be referred to simply as a "battery"). In this example, the second drive system is considered an electric drive system of the powertrain 10. The first and second drive systems generate torque to drive one or more sets of vehicle drive wheels 28 of the electrified vehicle 12. Although a power-split configuration is shown, this disclosure extends to any hybrid or electric vehicle including full hybrids, parallel hybrids, series hybrids, mild hybrids or micro hybrids.

The engine 14, which in one embodiment is an internal combustion engine, and the generator 18 may be connected through a power transfer unit 30, such as a planetary gear set. Of course, other types of power transfer units, including other gear sets and transmissions, may be used to connect the engine 14 to the generator 18. In one non-limiting embodiment, the power transfer unit 30 is a planetary gear set that includes a ring gear 32, a sun gear 34, and a carrier assembly 36.

The generator 18 can be driven by the engine 14 through the power transfer unit 30 to convert kinetic energy to electrical energy. The generator 18 can alternatively function as a motor to convert electrical energy into kinetic energy, thereby outputting torque to a shaft 38 connected to the power transfer unit 30. Because the generator 18 is operatively connected to the engine 14, the speed of the engine 14 can be controlled by the generator 18.

The ring gear 32 of the power transfer unit 30 may be connected to a shaft 40, which is connected to vehicle drive wheels 28 through a second power transfer unit 44. The second power transfer unit 44 may include a gear set having a plurality of gears 46. Other power transfer units may also be suitable. The gears 46 transfer torque from the engine 14 to a differential 48 to ultimately provide traction to the vehicle drive wheels 28. The differential 48 may include a plurality of gears that enable the transfer of torque to the vehicle drive wheels 28. In one embodiment, the second power transfer unit 44 is mechanically coupled to an axle 50 through the differential 48 to distribute torque to the vehicle drive wheels 28.

The motor 22 can also be employed to drive the vehicle drive wheels 28 by outputting torque to a shaft 52 that is also connected to the second power transfer unit 44. In one embodiment, the motor 22 and the generator 18 cooperate as part of a regenerative braking system in which both the motor 22 and the generator 18 can be employed as motors to output torque. For example, the motor 22 and the generator 18 can each output electrical power to the battery assembly 24.

The battery assembly 24 is an example type of electrified vehicle battery. The battery assembly 24 may include a high voltage traction battery pack that includes a plurality of battery cells capable of outputting electrical power to operate the motor 22 and the generator 18. Other types of energy storage devices and/or output devices can also be used to electrically power the electrified vehicle 12.

In one non-limiting embodiment, the vehicle 12 has two basic operating modes. The vehicle 12 may operate in an Electric Vehicle (EV) mode where the motor 22 is used (generally without assistance from the engine 14) for vehicle propulsion, thereby depleting the battery assembly 24 state of charge up to its maximum allowable discharging rate under certain driving patterns/cycles. The EV mode is an example of a charge depleting mode of operation for the vehicle 12. During EV mode, the state of charge of the battery assembly 24 may increase in some circumstances, for example due to a period of regenerative braking. The engine 14 is generally OFF under a default EV mode but could be operated as necessary based on a vehicle system state or as permitted by the operator.

The electrified vehicle 12 may additionally operate in a Hybrid (HEV) mode in which the engine 14 and the motor 22 are both used for vehicle propulsion. The HEV mode is an example of a charge sustaining mode of operation for the electrified vehicle 12. During the HEV mode, the electrified vehicle 12 may reduce the motor 22 propulsion usage in order to maintain the state of charge of the battery assembly 24 at a constant or approximately constant level by increasing the engine 14 propulsion usage. The electrified vehicle 12 may be operated in other operating modes in addition to the EV and HEV modes within the scope of this disclosure.

Figure 2:
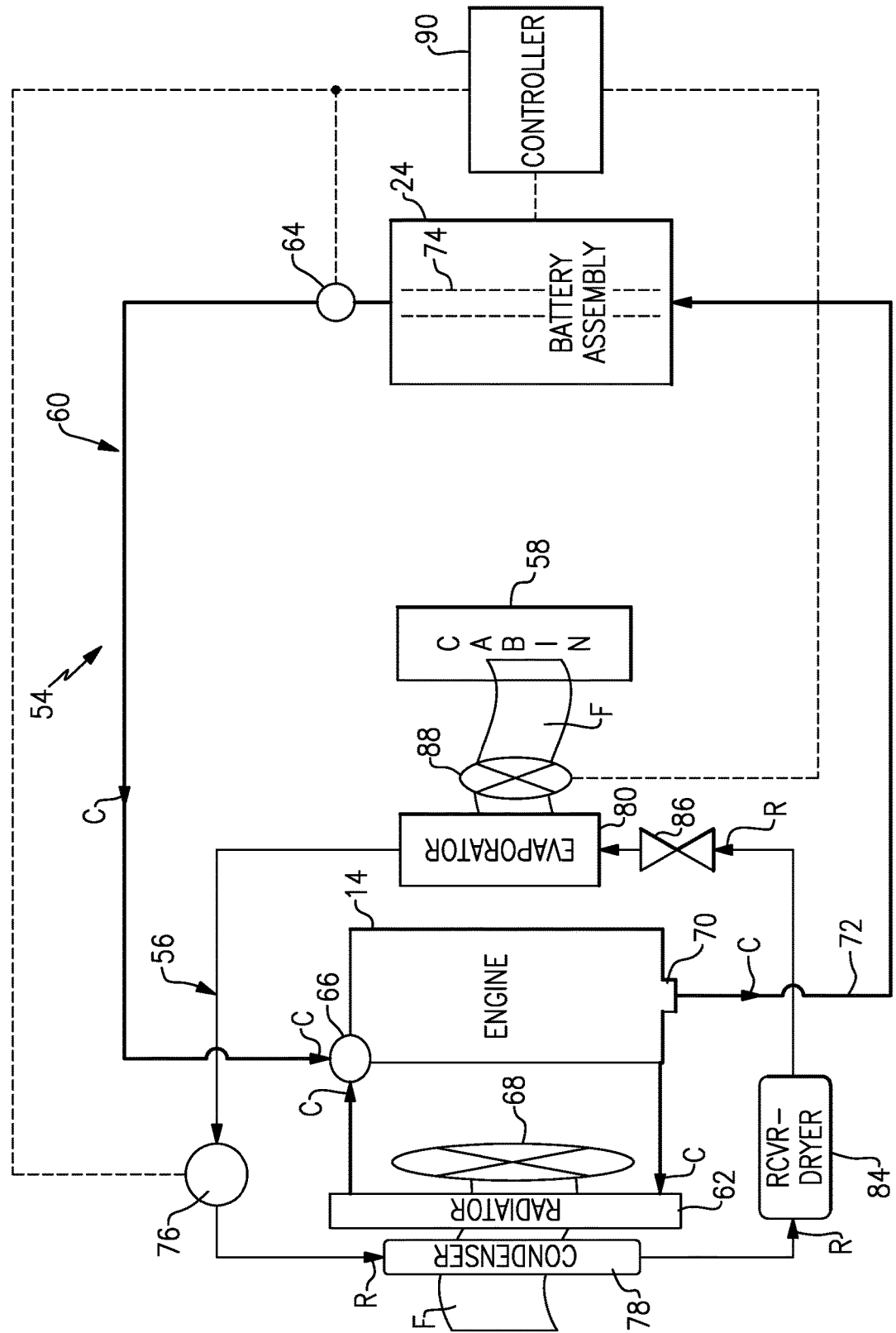
FIG. 2 illustrates a battery thermal management system for an electrified vehicle.

FIG. 2 schematically illustrates a thermal management system 54 that can be incorporated into an electrified vehicle, such as the vehicle 12 of FIG. 1. The thermal management system 54 may be used to manage the thermal load generated by various vehicle components, such as the engine 14, the battery assembly 24, and a passenger cabin 58. In one embodiment, the thermal management system 54 a cabin thermal management system 56 (relatively thin line)

configured to thermally condition the passenger cabin 58 of the vehicle 12, and a battery thermal management system 60 (relatively thicker line) configured to thermally condition the battery assembly 24 of the vehicle 12. Although shown schematically, one would understand that the cabin thermal management system 56 and the battery thermal management system 60 include various conduits or passages such as tubes, hoses, pipes, etc.

The battery thermal management system 60, in this example, circulates a coolant C, such as glycol or any other coolant, to thermally manage the battery assembly 24. In one embodiment, the battery thermal management system 60 includes the engine 14, a radiator 62, various sensors, such as a temperature sensor 64, and various valves and pumps, such as pump 66. The battery thermal management system 60, in this disclosure, does not include a chiller configured to cool the coolant C before it reaches the battery assembly 24. Accordingly, this disclosure reduces cost relative to systems that include a chiller. Further, due to the lack of a chiller, in some conditions there is no direct, or intended, thermal exchange between the cabin thermal management system 56 and the battery thermal management system 60 in this disclosure. Certain components, such as the radiator 62 and a condenser 78 of the cabin thermal management system 56, for example, may still have a thermal effect on one another under certain conditions, as will be discussed below.

During operation of the battery thermal management system 60, the pump 66, which may be an engine pump that is operatively coupled to the engine 14, communicates coolant C to the engine 14. The coolant C absorbs heat within the engine 14. A portion of the coolant C may be communicated to the radiator 62. A blower 68, such as a fan adjacent the engine 14, draws airflow F through the radiator 62 for undergoing heat transfer with the portion of the coolant C. For example, heat from the coolant C absorbed by the airflow F to cool the coolant C. The relatively cool coolant C can then be communicated back to the engine 14 for cooling the engine 14. Meanwhile, some of the coolant C may exit the engine 14. In this example, the coolant C exits the engine 14 adjacent a thermostat 70 into a line 72. In one embodiment, the thermostat 70 is a dual stage continuous regulator valve.

The coolant C within line 72 is directed downstream through the battery assembly 24. In this example, the coolant C is configured to flow through one or more passages 74 within the battery assembly 24 to either heat or cool the battery assembly 24. The passage(s) 74 may take any size, shape or configuration and is not limited to the schematic depiction of FIG. 2.

Downstream of the battery assembly 24, there is a temperature sensor 64 in this example. The temperature sensor 64 generates a signal indicative of a temperature of the coolant C that exits the battery assembly 24, and in some examples is indicative of the temperature of the battery assembly 24. Alternatively or in addition, a separate sensor or group of sensors may be mounted to the battery assembly 24 to generate a signal indicative of the temperature of the battery assembly 24. Coolant C exiting the battery assembly 24 ultimately flows back to the engine 14.

The cabin thermal management system 56, in the example of FIG. 2, circulates refrigerant R to transfer thermal energy to or from the passenger cabin 58. In this example, the cabin thermal management system 56 includes a compressor 76, which may be an electric air conditioning (EAC) compressor powered by an electrical source, a condenser 78, and an evaporator 80. During operation of the cabin thermal management system 56, the compressor 76 pressurizes refrigerant R and directs relatively high pressure refrigerant R to the condenser 78. Within the condenser 78, the high pressure refrigerant R exchanges heat with the airflow F from the blower 68. The condenser 78 transfers heat to the surrounding environment by condensing the refrigerant R from a vapor to a liquid. Next, the liquid refrigerant R exits the condenser 78 and, in one example, is communicated to a receiver dryer 84, which separates entrained air and gases in the refrigerant R as it flows through the receiver dryer 84. A valve 86, in this example, is configured to expand the refrigerant R and control the flow of refrigerant R to the evaporator 80. Within the evaporator 80, heat is transferred between the surrounding environment and the refrigerant R, thereby causing the refrigerant R to vaporize. A cabin blower 88, such as a fan, may communicate an airflow F across the evaporator 80 for effectuating such heat transfer and to deliver conditioned airflow to the passenger cabin 58. The speed of the cabin blower 88 is selectively adjustable. Refrigerant exiting the evaporator 80 flows back to the compressor 76.

The thermal management system 54 may additionally include a controller 90. The controller 90 is interfaced with and configured to control operation of the thermal management system 54, including the cabin thermal management system 56 and the battery thermal management system 60. In particular, the controller 90 is configured to receive signals and information from various components of the thermal management system 54 and to issue one or more executable instructions (e.g., commands) to various components of the thermal management system 54. The controller 90 may be part of an overall vehicle control unit, such as a vehicle system controller (VSC), or could alternatively be a stand-alone control unit separate from the VSC. The controller 90 may include a processing unit and non-transitory memory for executing the various control strategies and modes of the thermal management system 54.

The controller 90 may include a neural network or may be in electronic communication with a cloud-based neural network. This disclosure is not limited to neural networks and includes other learning tools such as probabilistic models used to make inferences or predictions. The controller 90 may include one or more lookup tables or algorithms in place of or in addition to a neural network.

In this disclosure, the controller 90 is configured to issue one or more instructions to the thermal management system 54 to balance the manner in which the thermal management system 54 thermally conditions the battery assembly 24 and the passenger cabin 58. For instance, due to the close proximity of the radiator 62 and the condenser 78, it may become increasingly difficult to meet a cooling demand of the battery assembly 24 if the condenser 78 is also working to meet a cooling demand of the passenger cabin 58. In this disclosure, under certain conditions, the cooling demand of the passenger cabin 58 is de-prioritized to permit the thermal management system 54 to meet a cooling demand of the battery assembly 24 to avoid undesirable conditions of the battery assembly 24.

In a particular aspect of this disclosure, the controller 90 is configured issue one or more instructions to reduce the speed of the compressor 76 based a plurality of factors. By reducing the speed of the compressor 76, the flow through the condenser 78 is reduced or stopped altogether, and the refrigerant R within the cabin thermal management system 56 transfers less heat relative to the airflow F, permitting additional heat transfer between the airflow F and the radiator 62. As will be explained below, the controller 90 is, in some conditions, configured to turn off the compressor 76 completely such that no refrigerant R flows through the condenser 78. In other conditions, the controller 90 is configured to partially reduce (i.e., slow) the speed of the compressor 76 to a non-zero speed but less than what the compressor 76 normally would be running to meet a demand to cool the passenger cabin 58.

In this disclosure, the controller 90 considers at least a speed of the vehicle 12 and a temperature of the battery assembly 24 when determining whether to reduce the speed of the compressor 76. For instance, the speed of the vehicle 12 is directly proportional to amount of airflow F available to flow over the radiator 62 and condenser 78. Further, the temperature of battery assembly 24, which may be obtained from the sensor 64 and/or other sensors, is indicative of whether the battery assembly 24 requires cooling such that the control strategy of this disclosure should be followed.

Figure 3:
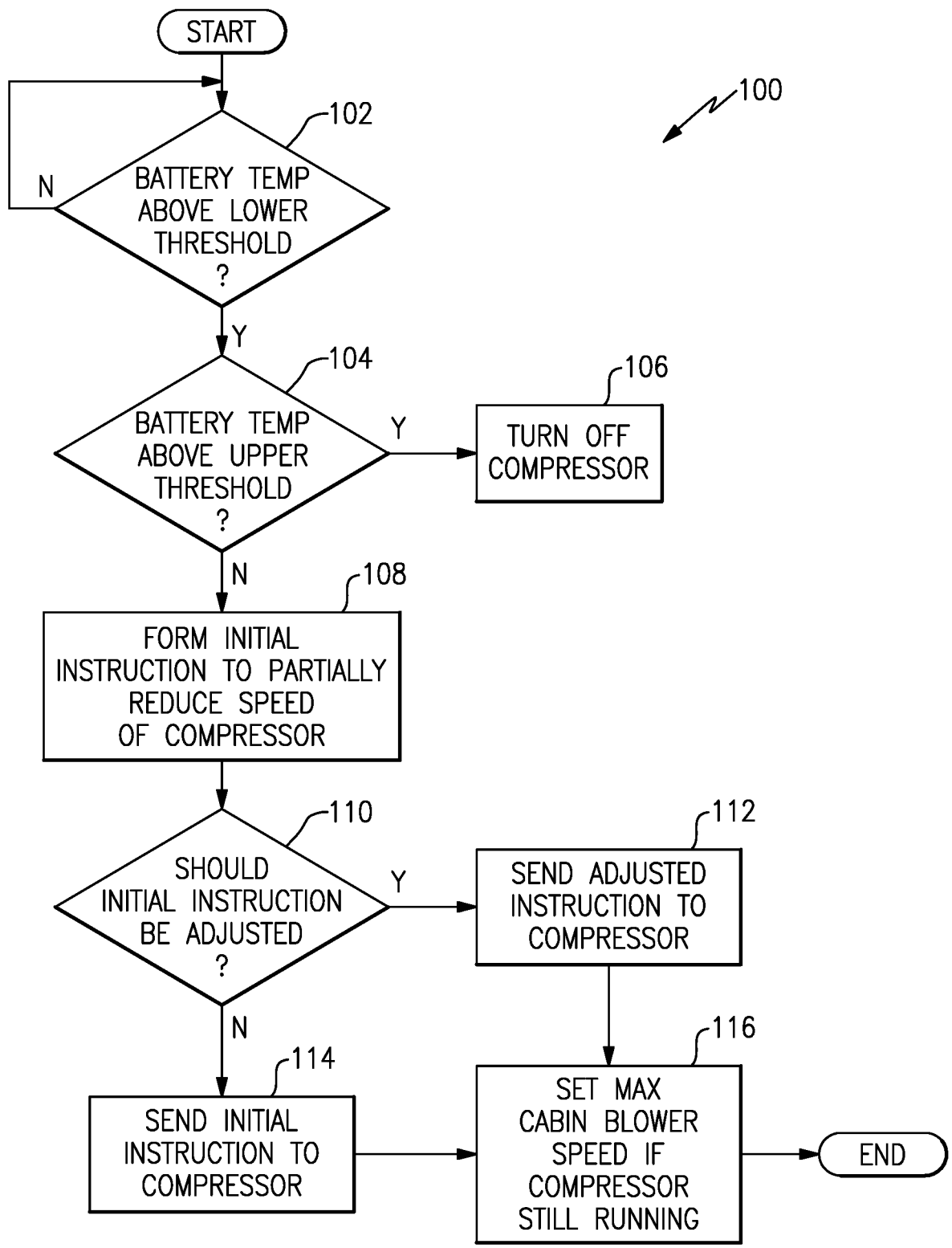
FIG. 3 is a flow chart representative of an example method of this disclosure.

FIG. 3 is a flow chart representative of an example method 100 according to this disclosure. The method 100 is carried out by various components of the thermal management system 54 in response to instructions from the controller 90.

At 102, the controller 90 considers whether the temperature of the battery assembly 24 meets or exceeds a lower battery threshold. If the temperature of the battery assembly 24 is beneath the lower battery threshold, then the controller 90 does not follow the control strategy of FIG. 3 because the battery assembly 24 does not require preferential cooling and the cabin thermal management system 56 can operate normally. In one example, the lower battery threshold is 50° C. (122° F.).

If, however, the temperature of the battery assembly 24 is above the lower battery threshold, then the controller 90 continues by, at 104, determining whether the temperature of the battery assembly 24 meets or exceeds an upper battery threshold. The upper battery threshold is a temperature which is known to be associated with or known to lead to undesirable operating conditions of the battery assembly 24. Thus, if the temperature of the battery assembly 24 meets or exceeds this value, the controller 90 is configured to issue an instruction to stop, or turn off, the compressor 76, at 106. In one example, the upper battery threshold is 65° C. (149° F.).

If the temperature of the battery assembly 24 falls between the lower and upper battery thresholds, then the controller 90 attempts to strike a balance between providing cooling to the battery assembly 24 and the passenger cabin 58. In this disclosure, the controller 90 favors cooling of the battery assembly 24 until the temperature of the battery assembly 24 falls back below the lower battery threshold.

Specifically, at 108, the controller 90 is configured to form an initial instruction to partially reduce the speed of the compressor 76. The initial instruction is not immediately sent to the compressor 76 in one example. Specifically, the initial instruction may include setting an RPM of the compressor 76 or instructing the compressor 76 to run at a particular percentage of its maximum speed or capacity. The initial instruction is based on both a speed of the vehicle 12 and a temperature of the battery assembly 24. In general, the controller 90 will balance the two factors, and will generally form an initial instruction that reduces the speed of the compressor 76 with increasing speed of the vehicle 12 and/or increasing temperature of the battery. In one example, the temperature of the battery assembly 24 is 55° C. and the speed of the vehicle 12 is 50 mph, and the initial instruction is to reduce the speed of the compressor 76 by 30%. In another example, with the same temperature of the battery assembly 24, the speed of the vehicle 12 is 25 mph, and the initial instruction is to reduce the speed of the compressor 76 by 50%. The initial instruction may be determined using a lookup table or algorithm.

The controller 90 then determines whether the initial instruction should be adjusted, at 110, before being delivered to the compressor 76. Specifically, the controller 90 is configured to selectively adjust the initial instruction based on a probability of a cabin cooling request. The probability of a cabin cooling request is based on the likelihood that a driver or passenger of the vehicle 12, for example, will provide an input indicating their desire for cooling within of the passenger cabin 58.

If there is a high likelihood that a cabin cooling request will come before the temperature of the battery assembly 24 can be reduced below the lower battery threshold, then the controller 90 attempts to strike a balance whereby some level of cooling of the passenger cabin 58 will be provided while the battery assembly 24 is also cooled, at 112. If there is a low likelihood of a cabin cooling request, then the controller 90 cools the battery assembly 24 without regard for cooling the passenger cabin 58, and the initial instruction is sent to the compressor 76, at 114.

At 110, if the answer is yes, then the initial instruction is adjusted based on based on a temperature of the passenger cabin 58 and an ambient temperature. In one example, the controller 90 is configured to adjust the initial instruction such that the controller 90 issues an instruction to fully stop (i.e., completely stop or turn off) the compressor 76 if the temperature of the passenger cabin 58 meets or is below a lower cabin threshold. In this way, when the temperature of the passenger cabin 58 is low, the controller 90 determines that there is a very low likelihood of a cabin cooling request, and thus the compressor 76 can be turned off in order to fully prioritize cooling of the battery assembly 24. In an example, the lower cabin threshold is 0° F. (about −18° C.).

When the temperature of the passenger cabin 58 is above the lower cabin threshold and below an upper cabin threshold, which is a temperature where a cooling request is highly likely if not inevitable, the controller 90 increases the speed of the compressor 76 with increasing temperature of the passenger cabin 58 and/or increasing ambient temperature, which is the temperature of the environment outside the vehicle 12. In an example, when the temperature of the passenger cabin 58 is 65° F. (about 18° C.) and the ambient temperature is 60° F. (about 15° C.), the controller 90 determines that there is a medium likelihood of a cabin cooling request and adjusts the initial instruction such that the speed of the compressor 76 is increased by 10%. Again, the controller 90 may use a lookup table or an algorithm to make the adjustments. Continuing with the examples discussed above, the aforementioned initial instructions to reduce the speed of the compressor 76 by 30% and 50% would be adjusted such that the compressor 76 speed would only be reduced by 20% and 40%, respectively. The adjusted instructions are then sent to the compressor 76 as final instructions. The term "final" is used herein simply to refer to an instruction that is sent to the compressor 76. The final instruction could continually be updated as conditions change.

At 114, the controller 90 does not adjust the initial instruction if there is a low likelihood of a cabin cooling request. For example, the controller 90 does not adjust the initial instruction when the temperature of the passenger cabin 58 meets or is above the upper cabin threshold. The upper cabin threshold may be 75° F. (about 24° C.) in an example. If the initial instruction is not adjusted, it becomes the final instruction sent to the compressor 76.

In a further aspect of this disclosure, at 116, when the controller 90 adjusts the speed of the compressor 76 such that it is operating slower than it would be under normal conditions, the controller 90 sets a maximum speed for the cabin blower 88. In particular, the controller 90 regulates the cabin blower 88 such that runs slower than under normal conditions, to avoid blowing excess airflow F into the passenger cabin 58, which avoids causing passenger discomfort from being too warm and/or avoids passenger confusion over the airflow F not having the temperature the passenger expects. The speed of the cabin blower 88 may be reduced in proportion to the reduction in speed to the compressor 76. The cabin blower 88 may be turned off completely in some examples.

It should be understood that terms such as "generally," "substantially," and "about" are not intended to be boundaryless terms, and should be interpreted consistent with the way one skilled in the art would interpret those terms.

Although the different examples have the specific components shown in the illustrations, embodiments of this disclosure are not limited to those particular combinations. It is possible to use some of the components or features from one of the examples in combination with features or components from another one of the examples. In addition, the various figures accompanying this disclosure are not necessarily to scale, and some features may be exaggerated or minimized to show certain details of a particular component or arrangement.

One of ordinary skill in this art would understand that the above-described embodiments are exemplary and non-limiting. That is, modifications of this disclosure would come within the scope of the claims. Accordingly, the following claims should be studied to determine their true scope and content.

The invention claimed is:

1. An electrified vehicle, comprising:
a cabin thermal management system configured to thermally condition a cabin of the electrified vehicle, the cabin thermal management system including a compressor;
a battery thermal management system configured to thermally condition a battery of the electrified vehicle; and
a controller configured issue an instruction to reduce the speed of the compressor based on a speed of the electrified vehicle and a temperature of the battery,
wherein the battery thermal management system is configured to circulate coolant to thermally condition the battery,
wherein the cabin thermal management system is configured to circulate refrigerant to thermally condition the cabin, and
wherein the battery and cabin thermal management systems are configured such that the coolant and refrigerant do not directly intermix.

2. The electrified vehicle as recited in claim 1, wherein:
the cabin thermal management system includes a cabin blower configured to communicate an airflow into a passenger cabin, and
when the controller issues the instruction to reduce the speed of the compressor, the controller is also configured to issue an instruction to reduce a speed of the cabin blower.

3. The electrified vehicle as recited in claim 1, wherein the controller is only configured to issue the instruction to reduce the speed of the compressor when the temperature of the battery meets or exceeds a lower battery threshold.

4. The electrified vehicle as recited in claim 3, wherein, when the temperature of the battery meets or exceeds an upper battery threshold, the controller is configured to issue an instruction to stop the compressor.

5. The electrified vehicle as recited in claim 4, wherein, when the temperature of the battery is between the lower battery threshold and the upper battery threshold, the controller is configured to form an initial instruction to partially reduce the speed of the compressor.

6. An electrified vehicle, comprising:
a cabin thermal management system configured to thermally condition a cabin of the electrified vehicle, the cabin thermal management system including a compressor;
a battery thermal management system configured to thermally condition a battery of the electrified vehicle;
a controller configured issue an instruction to reduce the speed of the compressor based on a speed of the electrified vehicle and a temperature of the battery,
wherein the controller is only configured to issue the instruction to reduce the speed of the compressor when the temperature of the battery meets or exceeds a lower battery threshold,
wherein, when the temperature of the battery meets or exceeds an upper battery threshold, the controller is configured to issue an instruction to stop the compressor,
wherein, when the temperature of the battery is between the lower battery threshold and the upper battery threshold, the controller is configured to form an initial instruction to partially reduce the speed of the compressor, and
wherein the controller is configured to selectively adjust the initial instruction based on a probability of a cabin cooling request.

7. The electrified vehicle as recited in claim 6, wherein the controller is configured to determine the probability of a cabin cooling request based on a cabin temperature and an ambient temperature.

8. The electrified vehicle as recited in claim 7, wherein the controller is configured to not adjust the initial instruction such that the controller issues an instruction to fully stop the compressor if the cabin temperature meets or is below a lower cabin threshold.

9. The electrified vehicle as recited in claim 8, wherein the controller is configured to instruct the compressor to run at a higher speed than the initial instruction when the cabin temperature is between a lower cabin threshold and an upper cabin threshold.

10. The electrified vehicle as recited in claim 1, wherein the electrified vehicle is one of a hybrid electric vehicle, plug-in hybrid electric vehicle, and a battery electric vehicle.

11. The electrified vehicle as recited in claim 1, wherein:
the cabin thermal management system includes a condenser, and
the battery thermal management system includes a radiator adjacent the condenser.

12. The electrified vehicle as recited in claim 11, the battery thermal management system does not include a chiller configured to cool the coolant that thermally conditions the battery.

13. A method, comprising:
thermally conditioning a battery of an electrified vehicle using a battery thermal management system;
thermally conditioning a cabin of the electrified vehicle using cabin thermal management system;

reducing a speed of a compressor of the cabin thermal management system based on a speed of the electrified vehicle and a temperature of the battery, wherein the battery thermal management system is configured to circulate coolant to thermally condition the battery, wherein the cabin thermal management system is configured to circulate refrigerant to thermally condition the cabin, and wherein the battery and cabin thermal management systems are configured such that the coolant and refrigerant do not directly intermix.

14. The method as recited in claim 13, wherein the reducing step is only performed when a temperature of the battery meets or exceeds a lower battery threshold.

15. The method as recited in claim 14, wherein the reducing step includes fully stopping the compressor when the temperature of the battery meets or exceeds an upper battery threshold.

16. The method as recited in claim 15, further comprising:
forming an initial instruction to reduce the speed of the compressor when the temperature of the battery is between a lower battery threshold and an upper battery threshold.

17. The method as recited in claim 16, further comprising:
selectively adjusting the initial instruction to form a final instruction based on a cabin temperature and an ambient temperature.

18. The method as recited in claim 17, further comprising:
increasing the speed of the compressor when there is a likelihood of a cabin cooling request.

19. The method as recited in claim 17, wherein, when the cabin temperature meets or is below a lower cabin temperature threshold, the final instruction is to fully stop the compressor.

* * * * *